(12) United States Patent
Rochford et al.

(10) Patent No.: US 10,976,982 B2
(45) Date of Patent: Apr. 13, 2021

(54) GUIDED VIEW MODE FOR VIRTUAL REALITY

(71) Applicant: Samsung Electronics Co., Ltd., Suwon-si (KR)

(72) Inventors: Ciaran Rochford, Bellevue, WA (US); Philippe Harscoet, Bellevue, WA (US); Xiaoguang Li, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/887,795

(22) Filed: Feb. 2, 2018

(65) Prior Publication Data

US 2019/0243599 A1 Aug. 8, 2019

(51) Int. Cl.
*G06F 3/14* (2006.01)
*G02B 27/01* (2006.01)
*G06T 19/00* (2011.01)

(52) U.S. Cl.
CPC ......... *G06F 3/1454* (2013.01); *G02B 27/017* (2013.01); *G06T 19/006* (2013.01); *G02B 2027/014* (2013.01)

(58) Field of Classification Search
CPC ................ G06F 3/04815; G06F 3/14; G02B 2027/0187; G02B 27/017; G06T 19/006
See application file for complete search history.

(56) References Cited

U.S. PATENT DOCUMENTS

| | | | |
|---|---|---|---|
| 8,547,401 B2 | 10/2013 | Mallinson et al. | |
| 8,836,771 B2 | 9/2014 | Strong | |
| 9,205,332 B2 | 12/2015 | Masuyama et al. | |
| 9,358,453 B2 | 6/2016 | Brosnan et al. | |
| 9,361,730 B2 | 6/2016 | Keating et al. | |
| 9,573,062 B1* | 2/2017 | Long | A63F 13/5255 |
| 9,751,005 B1* | 9/2017 | Dong | A63F 13/92 |
| 2008/0024523 A1* | 1/2008 | Tomite | G06T 19/006 |
| | | | 345/632 |
| 2012/0220369 A1 | 8/2012 | Shuster | |

(Continued)

FOREIGN PATENT DOCUMENTS

| | | | |
|---|---|---|---|
| EP | 3166319 A1 | 5/2017 | |
| EP | 3206122 A1 | 8/2017 | |

(Continued)

OTHER PUBLICATIONS

Kareem Anderson, "Microsoft researchers working on multi-person mixed reality experiences", on MSFT, http://www.winbeta.org/news/microsoft-researchers-working-multi-person-mixed-reality-experiences, 10 pages.

(Continued)

*Primary Examiner* — William Lu

(57) ABSTRACT

A method and apparatus for coordinating a master/follower device arrangement in a virtual reality (VR) environment is disclosed. A head mounted display (HMD) includes a transceiver, a display, and a processor coupled to the transceiver and display. The processor is configured to control the transceiver to receive, from at least one other HMD, data related to a field of view (FOV) of the at least one other HMD in a virtual reality (VR) environment. The processor is further configured to generate, using the data related to the FOV of the at least one other HMD, an FOV of the HMD in the VR environment.

41 Claims, 11 Drawing Sheets

(56) References Cited

U.S. PATENT DOCUMENTS

| | | |
|---|---|---|
| 2013/0162677 A1 | 6/2013 | Maaradji et al. |
| 2013/0194304 A1* | 8/2013 | Latta .................. G09G 3/003 |
| | | 345/633 |
| 2013/0238234 A1* | 9/2013 | Chao .................. G06K 9/46 |
| | | 701/409 |
| 2013/0281206 A1 | 10/2013 | Lyons et al. |
| 2013/0310160 A1 | 11/2013 | Froy et al. |
| 2014/0038707 A1 | 2/2014 | Hutcheson et al. |
| 2014/0080592 A1 | 3/2014 | Shuster |
| 2014/0364212 A1* | 12/2014 | Osman .................. A63F 13/213 |
| | | 463/31 |
| 2016/0055680 A1* | 2/2016 | Kim .................. G06F 3/012 |
| | | 345/633 |
| 2016/0074757 A1 | 3/2016 | Shuster |
| 2016/0147498 A1 | 5/2016 | Son et al. |
| 2016/0148417 A1* | 5/2016 | Kim .................. G06T 19/006 |
| | | 345/419 |
| 2016/0155231 A1 | 6/2016 | Raghoebardajal et al. |
| 2016/0163113 A1 | 6/2016 | Lyons et al. |
| 2016/0166926 A1 | 6/2016 | Hussman et al. |
| 2016/0214011 A1 | 7/2016 | Weising et al. |
| 2016/0246474 A1 | 8/2016 | Shuster |
| 2016/0364198 A1 | 12/2016 | Song et al. |
| 2017/0061936 A1* | 3/2017 | Matsuyama .......... G06T 19/006 |
| 2017/0150230 A1* | 5/2017 | Shimura .................. G06T 19/00 |
| 2017/0173451 A1* | 6/2017 | Pedersen .............. A63F 13/792 |
| 2018/0059812 A1* | 3/2018 | Inomata ................. G06F 3/0346 |
| 2018/0061138 A1* | 3/2018 | Neeter .................. G06T 19/006 |
| 2018/0164983 A1* | 6/2018 | Torii .................. G02B 27/01 |
| 2018/0232955 A1* | 8/2018 | Namgoong ........... G06T 19/006 |
| 2018/0268775 A1* | 9/2018 | Horneff .................. A63F 13/53 |
| 2018/0307042 A1* | 10/2018 | Riguer .................. G06F 3/147 |
| 2018/0329603 A1* | 11/2018 | Sawaki ................ G02B 27/017 |
| 2019/0279428 A1* | 9/2019 | Mack .................. A63F 13/211 |

FOREIGN PATENT DOCUMENTS

| | | |
|---|---|---|
| KR | 10-2013-0052291 A | 5/2013 |
| KR | 10-2005-0044488 A | 4/2015 |
| KR | 10-1670815 B1 | 10/2016 |
| KR | 10-2016-0145976 A | 12/2016 |
| WO | 2015192117 A1 | 12/2015 |
| WO | WO2016111470 A1 | 7/2016 |

OTHER PUBLICATIONS

High Fidelity: Virtual Reality for the Whole World, https://www.highfidelity.com, 2018, 7 pages.

Scott Hayden, "'BigScreen' Lets You Throw Virtual LAN Parties, Desktop Mirroring in VR", Road to VR, https://www.roadtovr.com/bigscreen-lets-throw-virtual-lan-parties-desktop-mirroring-vr/, Apr. 26, 2016, 4 pages.

ISA/KR, "International Search Report and Written Opinion of the International Searching Authority," International Application No. PCT/KR2019/001341, dated May 17, 2019, 10 pages.

Supplementary European Search Report in connection with European Application No. 19746828.3 dated Nov. 12, 2020, 21 pages.

* cited by examiner

GUIDED VIEW MODE FOR VIRTUAL REALITY

TECHNICAL FIELD

This disclosure relates generally to sharing a virtual reality environment. More specifically, this disclosure relates to systems and methods for sharing a virtual reality environment between one or more master devices and one or more follower devices.

BACKGROUND

Virtual reality headsets are increasingly common, and in many environments, it may be desirable to be able to share the virtual reality experience with others. However, the virtual reality environment created by virtual reality headsets is isolated, and it can be difficult to share an immersive virtual reality experience with others.

SUMMARY

Embodiments of the present disclosure provide systems and methods for sharing a virtual reality environment between one or more master devices and one or more follower devices.

In one embodiment, a head mounted display (HMD) is disclosed. The HMD includes a transceiver, a display, and a processor coupled to the transceiver and display. The processor is configured to control the transceiver to receive, from at least one other HMD, data related to a field of view (FOV) of the at least one other HMD in a virtual reality (VR) environment. The processor is further configured to generate, using the data related to the FOV of the at least one other HMD, an FOV of the HMD in the VR environment.

In another embodiment, another head mounted display (HMD) is disclosed. The HMD includes a transceiver, a display, and a processor coupled to the transceiver and display. The processor is configured to control the transceiver to transmit, to at least one other HMD, data related to a field of view (FOV) of the HMD in a virtual reality (VR) environment, wherein the data related to the FOV of the HMD is used to generate an FOV of the at least one other HMD in the VR environment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
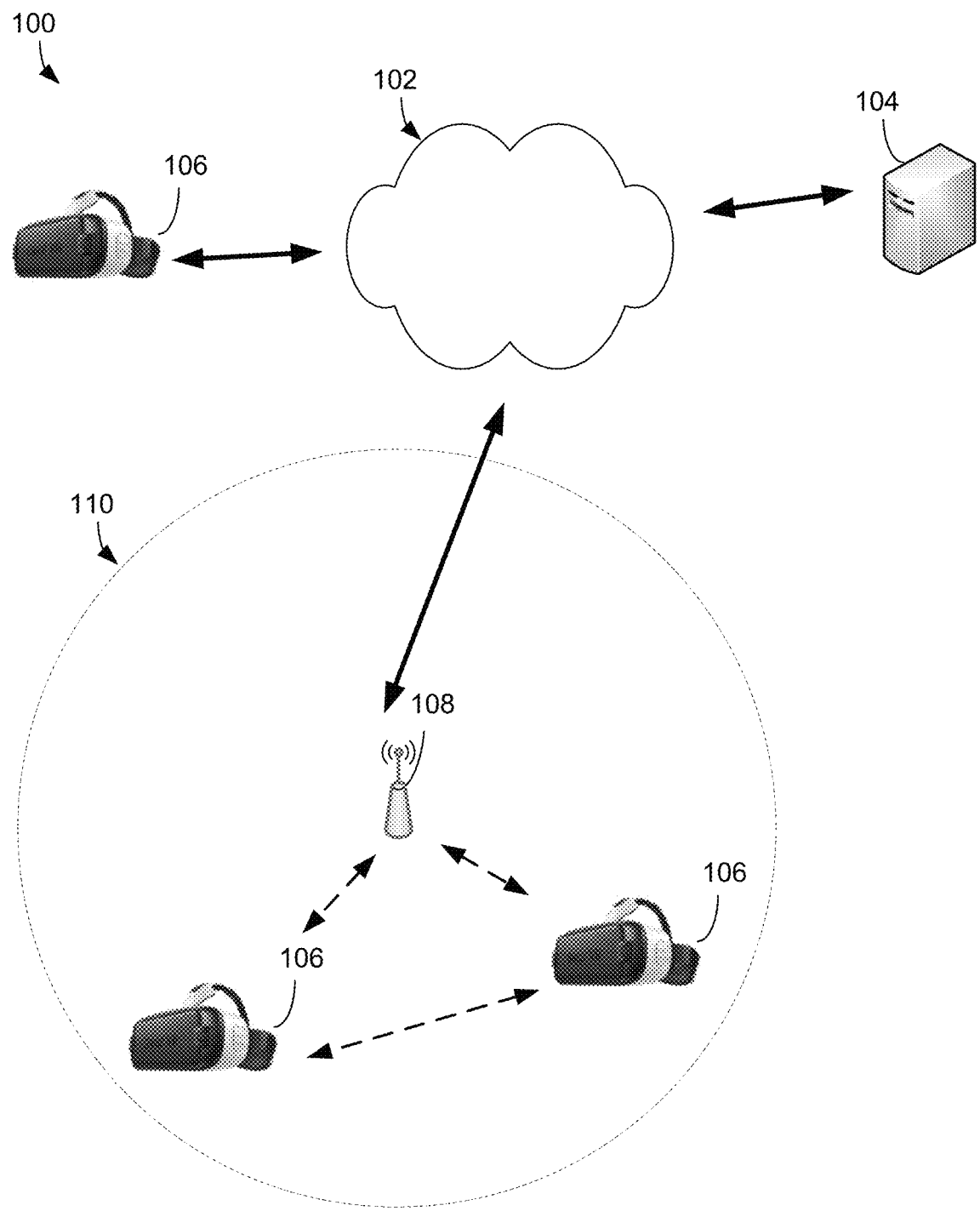
FIG. 1 illustrates an example computing system according to embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure relate to a shared virtual reality (VR) environment that is experienced through virtual reality devices such as head mounted (or mountable) devices (HMDs). A shared VR environment may be useful for various applications, such as instructional experiences (such as, virtual field trips), for VR application development (for example, to demonstrate bugs), to demonstrate features of a VR application to other users, to play VR video games, or the like. In a shared VR experience, one or more operators may have a "master" role assigned to their HMDs while the remaining operators have a "follower" role assigned to their HMDs. The HMDs assigned the master role (herein referred to as master HMDs) are able to control various aspects of the VR experience for the HMDs assigned the follower role (herein referred to as follower HMDs).

In some embodiments, a "VR guide" application (or app) is installed on each HMD to facilitate the shared VR experience. The VR guide app is able to coordinate the VR environment for each HMD, such as by providing, to each HMD, world data used to construct the VR environment for display. The world data could include, for example, virtual locations of objects, 2D or 3D models for objects, textures for objects, and the like. Additionally, the VR guide application could coordinate between HMDs in the shared environment to relay information from one or more HMDs to others of the HMDs. For example, the VR guide app could share position information of each HMD with each other HMD in order to render a model (such as, an avatar) related to each HMD in the virtual environment. As another example, the VR guide app could share action information (such as the action of selecting, highlighting, or otherwise interacting with an object in the VR environment) of one or more HMDs with each other HMD in order to allow the other HMDs to view the actions of the one or more HMDs within the VR environment.

The VR guide app of a particular HMD, in some embodiments, downloads world data from a server or from one of the HMDs before initiating a VR session. In some embodiments, the master HMD provides the world information, in a peer-to-peer (P2P) fashion, to share with the VR guide app of other HMDs in the VR session. In other embodiments, the VR guide app of a particular HMD streams the world data from the server or the master HMD in real time during the VR session. Real time streaming enable the HMDs to receive the world data to only render a portion of the VR environment that is currently being used in the VR session, thereby saving computational resources that might otherwise be used to render portions of the VR environment that are not currently in use.

In some embodiments, the various features of the disclosure described below are implemented using pre-existing world data. For example, world data of a 3D world that was not created with the intention of being used with the embodiments of this disclosure may be modified or extended by the VR guide app to provide the features described below using the pre-existing world data.

FIG. 1 illustrates an example computing system 100 according to various embodiments of this disclosure. The embodiment of the computing system 100 shown in FIG. 1 is for illustration only. Other embodiments of the computing system 100 could be used without departing from the scope of this disclosure.

The system 100 includes a network 102, which facilitates communication between various components in the system 100. For example, the network 102 may communicate Internet Protocol (IP) packets, frame relay frames, or other information between network addresses. The network 102 can include one or more local area networks (LANs), metropolitan area networks (MANs), wide area networks (WANs), all or a portion of a global network such as the Internet, or any other communication system or systems at one or more locations.

The network 102 facilitates communications between at least one server 104 and personal electronic devices such as head mountable displays (HMDs), or head mountable devices, 106. In some embodiments, the HMDs 106 are devices designed to create a virtual reality environment. Each server 104 includes any suitable computing hardware or processor that can provide computing services for one or more personal electronic devices. Each server 104 could, for example, include one or more processors, one or more memories storing instructions and data, and one or more network interfaces facilitating communication over the network 102.

An HMD 106 can be any suitable computing or processing device that interacts with at least one server or other computing device(s) over the network 102, and that is able to provide a virtual reality experience. The HMD 106 could, for example, be a mobile device such as a mobile phone used in a headset, an accessory device connected to another computing device, a virtual reality headset, or the like. Any other or additional electronic devices could be used in the computing system 100.

In some embodiments, the HMDs 106 communicates directly with each other. For example, the HMDs 106 can communicate via BLUETOOTH, WI-FI DIRECT, near field communication (NFC), or the like. In some embodiments, the HMDs 106 communicate indirectly with each other through an access point 108, which may be a WLAN access point covering the area 112. In some embodiments, the HMDs 106 communicate indirectly with the network 102. For example, the HMDs 106 communicate via one or more access points 108, which may be base stations such as IEEE 802.11 wireless access points, or via cellular base stations or eNodeBs. Note that these examples are for illustration only and that the HMDs 106 could communicate directly or indirectly with each other or indirectly with the network 102 via any suitable intermediate device(s) or network(s).

The server 104 provides communication services to the HMDs 106. In some embodiments, the server 104 hosts a virtual reality session for one or multiple HMDs 106, and handles synchronization of the fields of view (FOV) of different HMDs 106 with each other. For example, as will be further described below, one of the HMDs 106 can be a master device and one or more of the remaining HMDs 106 can be follower (or slave) devices that are synchronized to the same FOV as the master device. In some embodiments, the server 104 handles communication, between HMDs 106, of information used to synchronize FOVs. In some embodiments, the server 104 performs various computations related to hosting a virtual reality environment.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
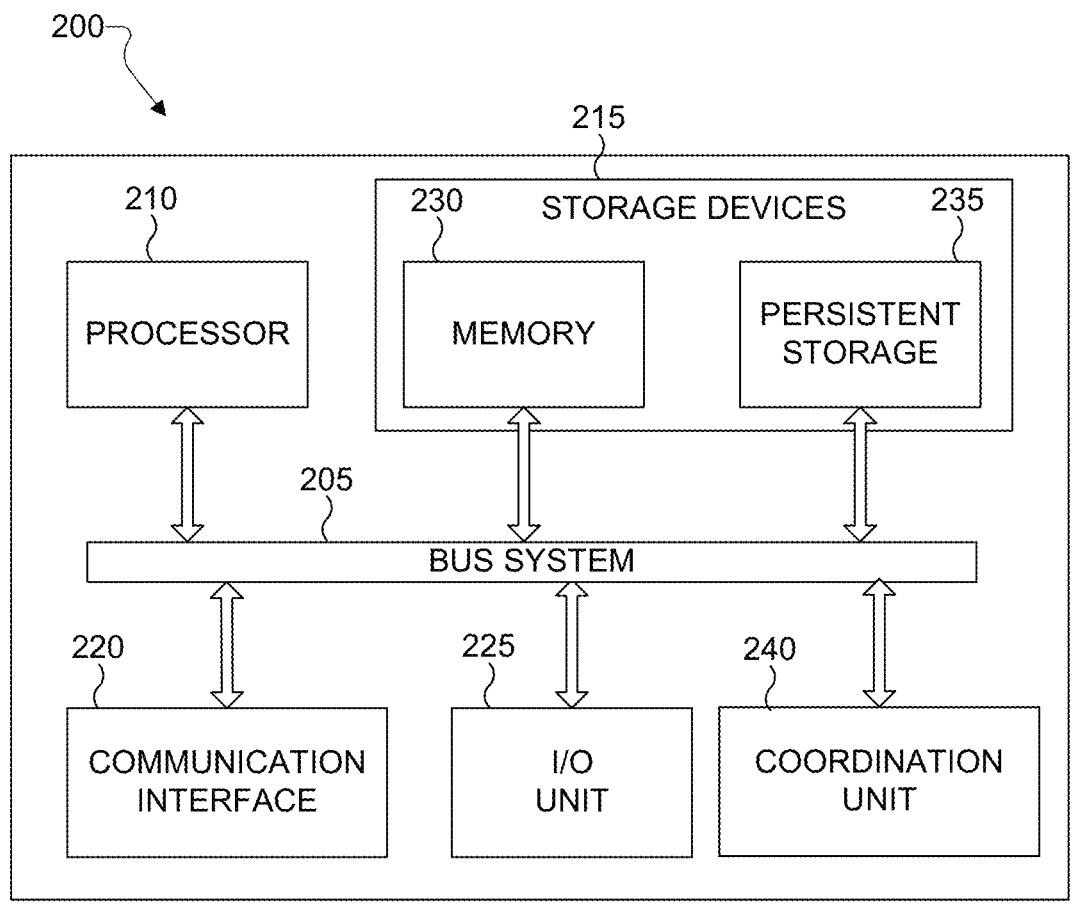
FIG. 2 illustrates an example computing system according to embodiments of the present disclosure.
Figure 3:
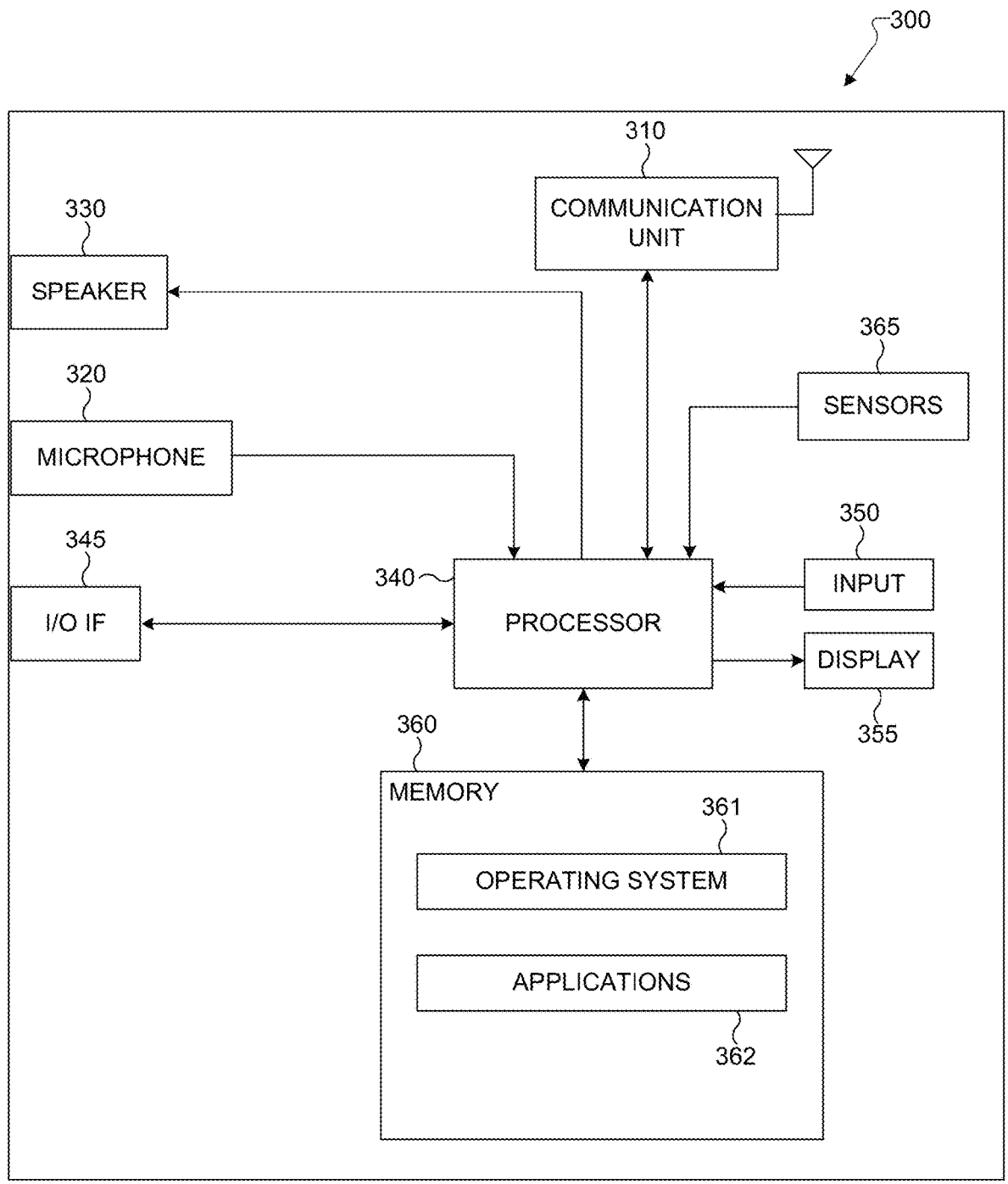
FIG. 3 illustrates an example electronic device according to embodiments of the present disclosure.

FIGS. 2 and 3 illustrate example devices in a computing system according to this disclosure. In particular, FIG. 2 illustrates an example computer system 200 and FIG. 3 illustrates an example electronic device 300. For example, the computer system 200 could represent the server 104 in FIG. 1, and the electronic device 300 could represent the HMDs 106 in FIG. 1. In some embodiments, the electronic device 300 could comprise a mobile phone combined with a virtual reality accessory, such as a headset.

The computer system 200 includes a bus system 205. The bus system 205 supports communication between at least one processor 210, at least one storage device 215, at least one communication interface 220, at least one input/output (I/O) unit 225, and a coordination unit 240.

The processor 210 executes instructions that may be loaded into a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 represents a random access memory or any other suitable volatile or non-volatile storage device(s). The persistent storage 235 may contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless communication unit facilitating communications over the network 102, which may be, for example, a LAN that covers the area 110 of FIG. 1. The communication interface 220 can support communications through any suitable physical or wireless communication link(s).

The I/O unit 225 allows for input and output of data. For example, the I/O unit 225 provides a connection for user input through a keyboard, mouse, keypad, touchscreen, or other suitable input device. The I/O unit 225 also sends output to a display, printer, or other suitable output device.

The coordination unit 240 handles master/follower coordination services for electronic devices such as the HMDs 106, as will be described in more detail below. The coordination unit 240 receives information on FOVs and actions of HMDs 106, and can relay that information to other HMDs 106 to allow for rendering of virtual locations (or positions) and actions of one or more HMDs 106 within the FOV of other HMDs 106. The coordination unit 240 also receives instructions from one or more HMDs 106 (such as master HMDs 106) to relay to other HMDs 106 (such as follower HMDs 106). The coordination unit 240 additionally provides world data to each HMD 106 for use in rendering the 3D world (or environment). The functions of the coordination unit 240 may coincide with the coordination functions of the VR guide app disclosed above.

Note that while FIG. 2 is described as representing the server 104 of FIG. 1, the same or similar structure could be used in the HMD 106 or any other electronic device in system 100. For example, FIG. 2 could represent features of the access point 108 of FIG. 1.

In the example shown in FIG. 3, the electronic device 300 includes a communication unit 310 that can be, for example, a radio frequency (RF) transceiver, a BLUETOOTH transceiver, or a WI-FI transceiver. The electronic device 300 also includes a speaker 330, a processor 340, an input/output (I/O) interface (IF) 345, an input interface 350, a display 355, a memory 360, and sensors 365. The memory 360 includes an operating system (OS) program 361 and one or more applications 362, which could include a VR guide application, as disclosed above. In some embodiments, the electronic device 300 also functions as a mobile phone.

The communication unit 310 receives an incoming RF signal such as A BLUETOOTH or WI-FI signal. The communication unit 310 down-converts the incoming RF signal to generate an intermediate frequency (IF) or baseband signal, then generates a processed baseband signal by filtering, decoding, and/or digitizing the baseband or IF signal. The communication unit 310 transmits the processed baseband signal to the processor 340 for further processing (such as for web browsing data, online gameplay data, notification data, or other message data).

The communication unit 310 also receives analog or digital voice data or other outgoing baseband data (such as web data, e-mail, or interactive video game data) from the processor 340. The communication unit 310 encodes, multiplexes, and/or digitizes the outgoing baseband data to generate a processed baseband or IF signal. When the communication unit 310 is an RF transceiver, the communication unit 310 up-converts the baseband or IF signal to an RF signal that is transmitted via an antenna.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310 in accordance with well-known principles. The processor 340 could also receive analog or digital voice data from the microphone 320, and output analog or digital audio to the speaker 330. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from external devices or an operator. The processor 340 is also coupled to the I/O interface 345, which provides the electronic device 300 with the ability to connect to other devices such as laptop computers and handheld computers. The I/O interface 345 is the communication path between these accessories and the processor 340.

The processor 340 is also coupled to the input interface 350 and the display 355. The operator of the electronic device 300 can use the input interface 350 to enter data into the electronic device 300. The display 355 can be a liquid crystal display or other display capable of rendering a virtual reality environment, including rendering text and/or graphics in the virtual reality environment, such as instructions and messages.

The memory 360 is coupled to the processor 340. Part of the memory 360 could include a random access memory (RAM), and another part of the memory 360 could include a Flash memory or other read-only memory (ROM).

The sensors 365 detect information related to the electronic device 300 and relay it to the processor 340 for further processing. For example, the sensors 365 can include an inertial measurement unit (IMU), which can determine a pose of the device 300. The pose of the device 300 may be a result of, for example, head movement of an operator wearing the device 300 as an HMD. Data from the IMU may be used, for example, to determine what to render for display on the display 355 based on the pose of the device 300. The information displayed on the display 355 is the information included in the FOV of the device 300, meaning that data from the IMU can be used to determine the FOV of the device 300. Data from the IMU also can be used in order to compare the pose of the device 300 with a pose of another device 300 in a shared VR environment, which could be used to determine whether an FOV of the device 300 is similar to the FOV of the other device 300. This may be useful, as further described below, to determine whether the device 300 should render actions performed by the other device 300 within the VR environment, or to determine whether the device 300 should switch an operational mode related to synchronizing the FOV of the device 300 with the FOV of the other device 300.

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processors 210 and 340 could be divided into multiple processors, such as one or more central processing units (CPUs) and one or more graphics processing units (GPUs). In addition, as with computing and communication networks, electronic devices and computer systems can come in a wide variety of configurations, and FIGS. 2 and 3 do not limit this disclosure to any particular client device or server.

Figure 4:
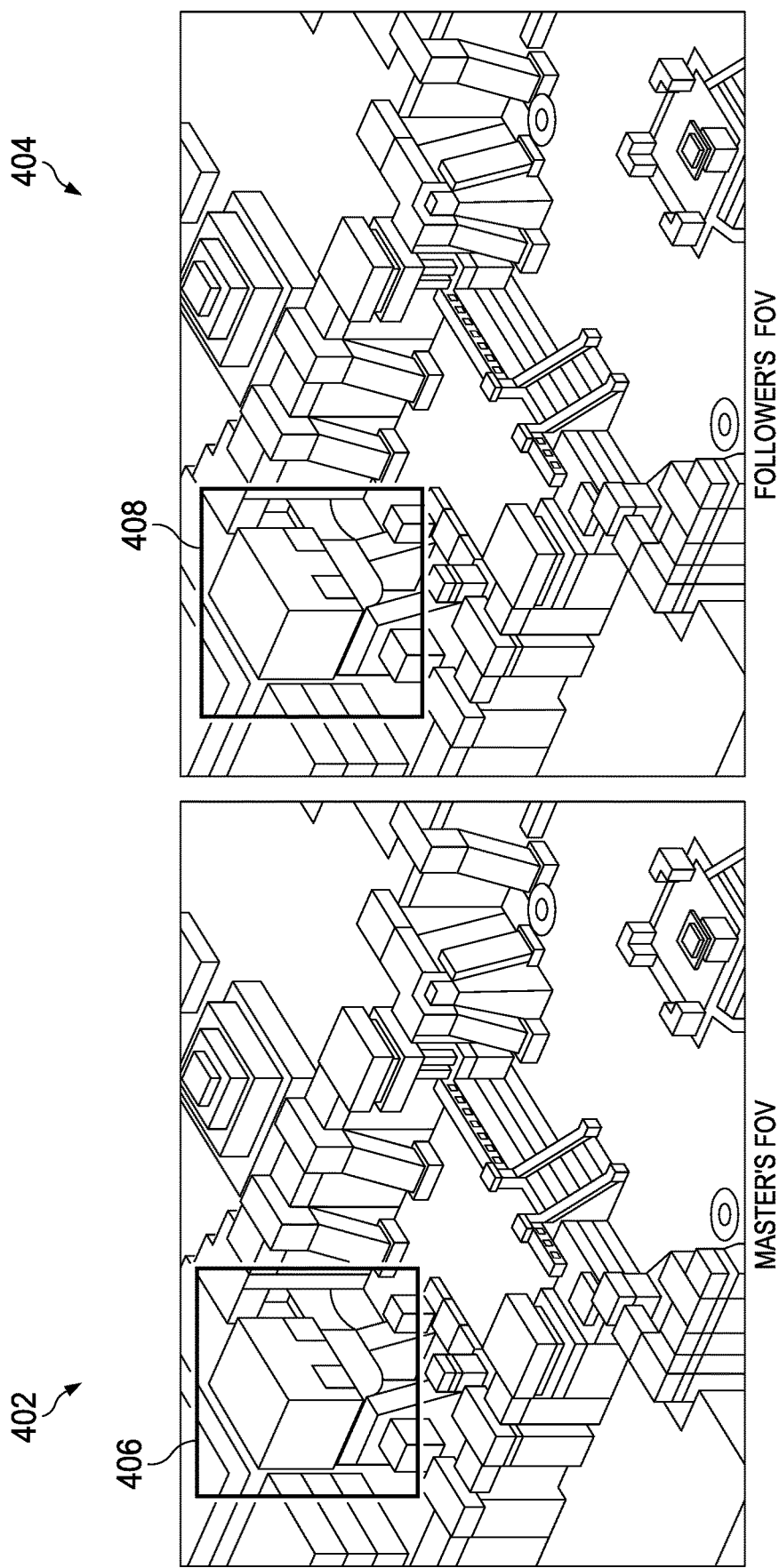
FIG. 4 illustrates an example set of master and follower FOVs of master and follower devices, respectively, that are operating in a fixed guided mode according to embodiments of the present disclosure.

FIG. 4 illustrates an example set of master and follower FOVs of master and follower devices, respectively, that are operating in a fixed guided mode according to various embodiments of this disclosure. The master FOV 402 can be generated on a display of a master HMD 106, and the follower FOV 404 can be generated on a display of a follower HMD 106. The FOVs of FIGS. 4-8 are merely exemplary, and do not necessarily represent how a stereoscopic image would actually be presented on a stereoscopic HMD.

In the fixed guided mode, the master HMD 106 sends information related to its FOV 402 to one or more follower HMDs 106, which use the information to generate their own follower FOVs 404 such that they match the master FOV 402 (that is, the follower HMDs 106 synchronize their follower FOVs 404 with the master FOV 402). Accordingly, both the master FOV 402 and the follower FOV 404 include renderings of the same portion of the shared virtual environment, viewed from the same position and angle. In this way, the master HMD 106 can control what is viewed with follower HMDs 106.

In some embodiments, the operator of the master HMD 106 (for example, a teacher) highlights one or more objects in the virtual reality environment. For example, the operator can utilize a highlight box 406 to highlight an object. In certain embodiments, different methods of highlighting are used, such as changing textures of the highlighted 3D object to have a bright color. Information related to the highlighting action is transmitted to follower HMDs 106, which replicate the highlighting within their follower FOVs 404, for example, by generating highlight boxes 408.

In this way, an operator of the master HMD 106, via the master HMB 106, may focus the attention of operators of the follower HMDs 106 on a particular object in the virtual environment. This master-focused highlighting may be useful for many applications, such as in business meetings and teaching purposes. In some embodiments, the highlighting further includes a display of information that is related to the highlighted object (such as, information about a historical building, information about a plant or animal, information about a feature of the VR application). This information could be input by the operator of the master HMD 106, or could be selected from a database of preexisting information by the operator of the master HMD 106.

In some embodiments, information related to various other actions of the master HMD 106 is transmitted to the follower HMDs 106, which may replicate those actions within the follower FOVs 404. For example the master HMD 106 can interact with the VR environment by moving or creating an object in the VR environment, which would be replicated in the follower FOVs 404.

Figure 5:
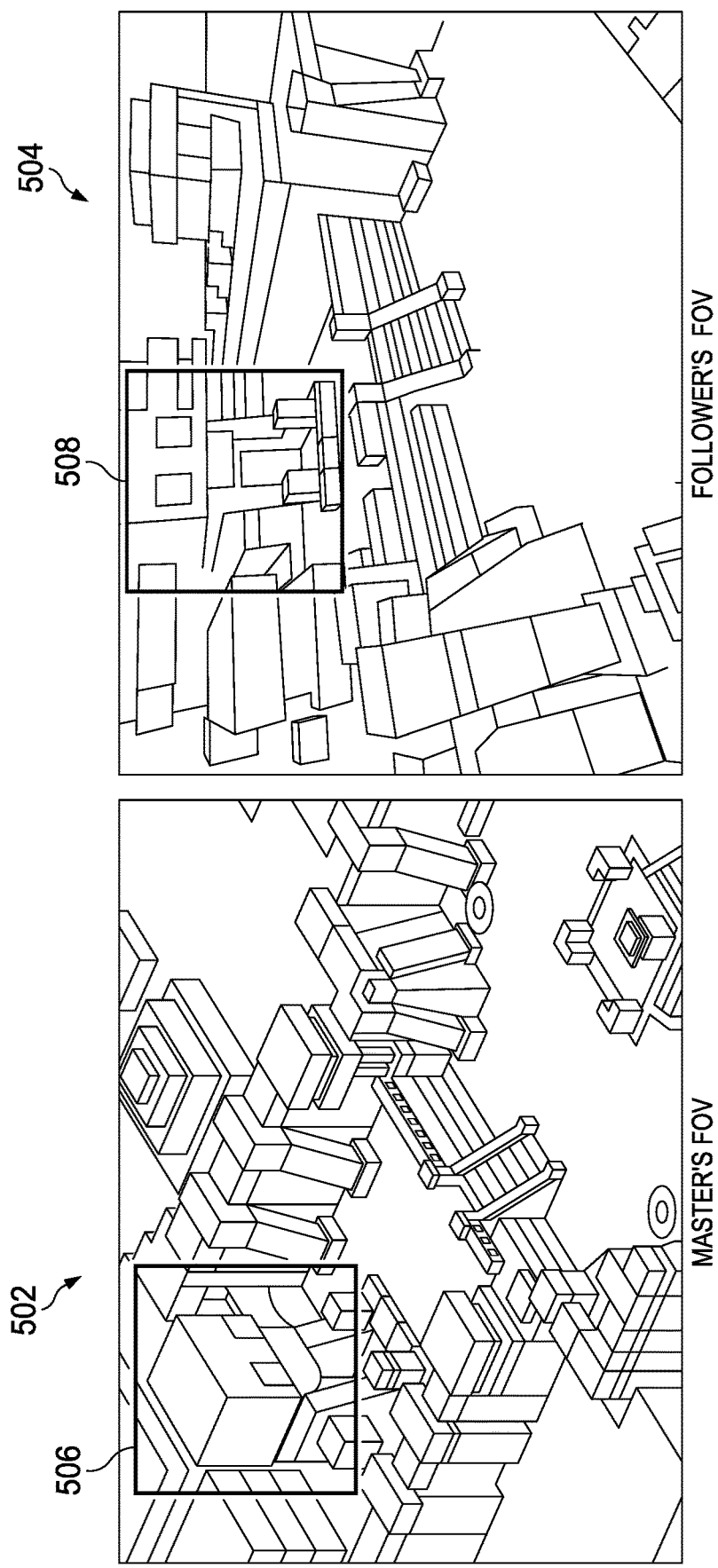
FIG. 5 illustrates an example set of master and follower FOVs of master and follower devices, respectively, that are operating in a flexible guided mode according to embodiments of the present disclosure.

FIG. 5 illustrates an example set of master and follower FOVs of master and follower devices, respectively, that are operating in a flexible guided mode according to various embodiments of this disclosure. The master FOV 502 can be generated on a display of a master HMD 106, and the follower FOV 504 can be generated on a display of a follower HMD 106.

In a flexible guided mode, an operator of a follower HMD 106 can freely maneuver the follower FOV 504 around the shared virtual environment. Accordingly, the follower FOV 504 does not necessarily match the master FOV 502. However, the master HMD 106 can still transmit information related to its FOV 503 to the follower HMD 106 that allows the follower HMDs 106 to perform various functions, as described below.

In some embodiments, the master HMD 106 can highlight an object in the shared VR environment as described above, such as with a highlight box 506. The master HMD 106 can transmit information related to this highlighting action to follower HMDs 106. Even though the follower HMD 106's FOV 504 does not exactly match the master FOV 502, if the highlighted object is within the follower FOV 504, the information related to the highlighted object can be used by the follower HMD 106 to generate a highlight box 508 (or other appropriate highlighting graphic) within the follower FOV 504. In this way, an operator of a follower HMD 106 can freely "move" through the shared virtual reality environment while still being able to receive information, such as instructional information, from the master HMD 106.

In some embodiments, information related to various other actions of the master HMD 106 are transmitted to the follower HMDs 106, which may replicate those actions within the follower FOVs 404 if the action takes place within the follower FOVs 404. For example the master HMD 106 could interact with the VR environment by moving or creating an object in the VR environment, which could be replicated in the follower FOVs 404.

In some embodiments, an operator of a follower HMD 106 activates a synchronization function that causes the follower FOV 504 to match (or synchronize with) the master FOV 502. For example, during a class or instructional session, the master HMD 106 and follower HMDs 106 can share a voice calling session (such as a VOW call), wherein the operator of the master HMD 106 (for example, a teacher) provides a lecture to operators of the follower HMDs 106 (for example, students). If a student decides that they would like to see what is in the teacher's FOV during an interesting portion of the lecture, the student can activate a feature to move the follower FOV 504 to the teacher's master FOV 502. In the flexible guided mode, the operator of the follower HMD 106 continues to control movement of the follower FOV 504 after it has synchronized with the master FOV 502.

In other embodiments, an operator of a master HMD 106 activates the synchronization function that causes follower FOVs 504 to match (or synchronize with) the master FOV 502. For example, during a class or instructional session, the teacher may allow students to "roam" around the shared VR environment, but at a key point in the class the teacher is able to recall the FOVs 504 of the students' HMDs 106 to match the master FOV 502. This forced recall function can include transmitting instructions to the follower HMDs 106 to move from the flexible guided mode to the fixed guided mode, or the function may only temporarily force the follower FOV 504 to match the master FOV 502. In the flexible guided mode, the operator of the follower HMD 106 continues to control movement of the follower FOV 504 once the follower HMD 106 has synchronized with the master FOV 502.

The above synchronization of FOVs may be jarring to operators of follower HMDs 106. For example, due to the nature of virtual reality displays and their creation of an immersive, realistic experience, an abrupt change of the follower FOV 504 could cause disorientation or motion sickness, or have other negative consequences for the operator of the follower HMD 106. To remedy the aforementioned effects, a transition animation may be used when synchronizing the follower FOV 504 to the master FOV 502. For example, the display of the follower HMD 106 may fade to black and fade back in at the new "position" that matches the master FOV 502. Alternatively, the follower FOV 504 can be zoomed out to a distant point of view that encompasses both the virtual location of the follower FOV 504 and the virtual location of the master FOV 502, and then zoomed in to the virtual location of the master FOV 502. In some embodiments, the follower HMD 106 causes a warning to be displayed in the follower FOV 504 to warn the operator of the impending transition. It is understood that any suitable transition animation can be used to minimize motion sickness, disorientation, and other negative effects of transition of the follower FOV 504 to match the master FOV 502.

Figure 6:
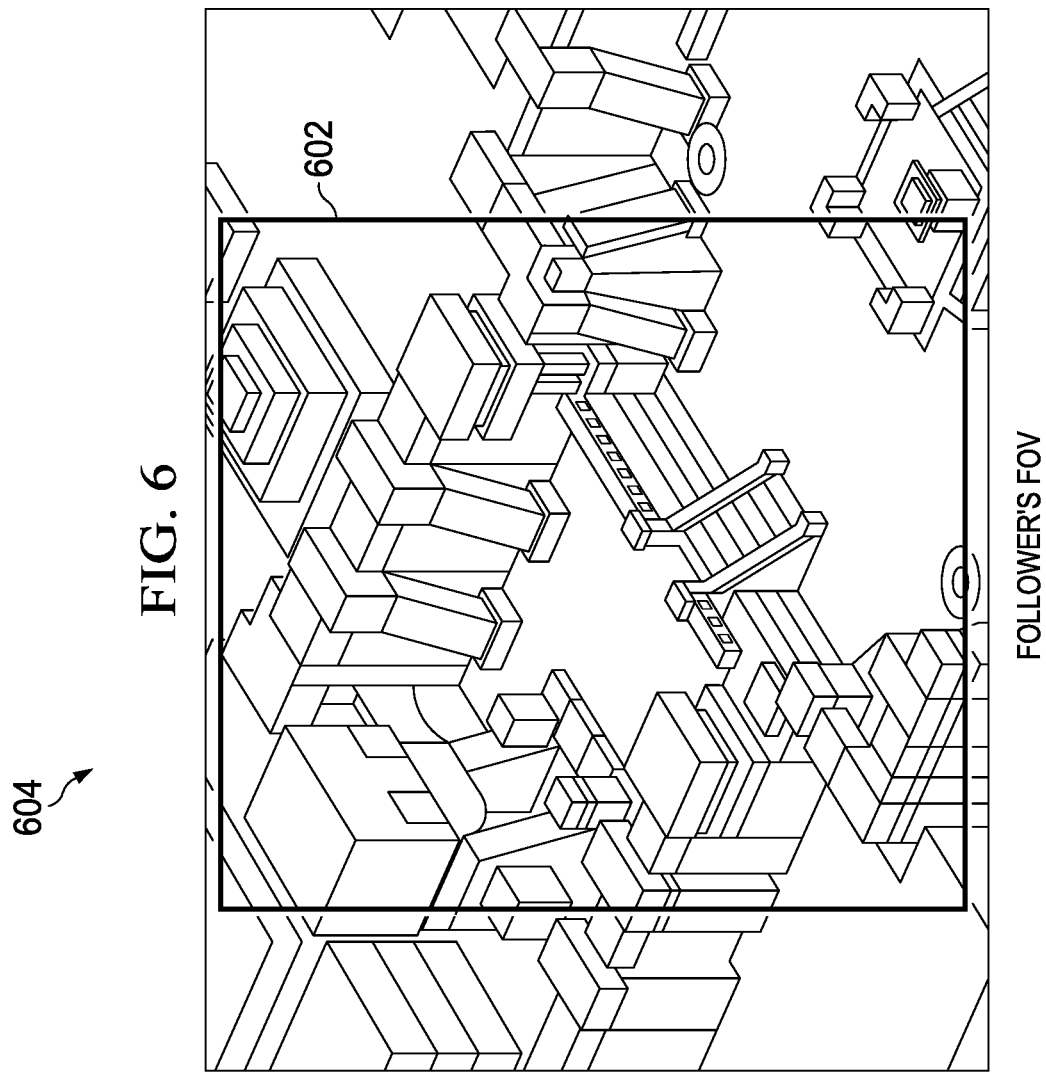
FIG. 6 illustrates an example follower FOV of a follower device according to embodiments of the present disclosure.

FIG. 6 illustrates an example follower FOV of a follower device according to various embodiments of this disclosure. The follower FOV 604 may be generated on a display of a follower HMD 106.

In some embodiments, a follower HMD 106 moves between fixed and flexible guided modes. For example, the follower HMD 106 can begin a VR session in the fixed guided mode, but sensors in the HMD (such as an IMU) can still track the pose of the follower HMD 106 even though the follower FOV 604 is locked to a master FOV (that is, even though the follower FOV 604 moves to match movement of the master FOV, and does not move based on changes in the pose of the follower HMD 106). When the pose of the follower HMD 106 moves a predetermined threshold amount away from its initial pose (for example, 20 degrees in any direction from the initial pose), the follower HMD 106 may interpret this as the operator wishing to "break away" from the master FOV to explore the VR environment, and the follower HMD 106 can move to a flexible guided mode, as described above. In some embodiments, the master HMD 106 can control whether the follower HMD 106 is allowed to move between the fixed and guided flexible modes in this way.

When the follower HMD 106 is in the flexible guided mode, the follower HMD 106 may still receive information related to the master FOV from the master HMD 106. In some embodiments, when the follower FOV 604 closely matches the master FOV, as determined based on the received information related to the master FOV, the follower HMD 106 can interpret this as an attempt to "lock" the follower FOV 604 to the master FOV. For example, the box 602 can represent the master FOV. When the follower FOV 604 centers on the box 602, the box 602 may be interpreted as an indication to move from the flexible guided mode to the fixed guided mode. In some embodiments, the box 602 may visually appear within the follower FOV 604 as a representation of a target that the operator of the follower HMD 106 may use to match the follower FOV 604 to the master FOV to enter the fixed guided mode.

Figure 7:
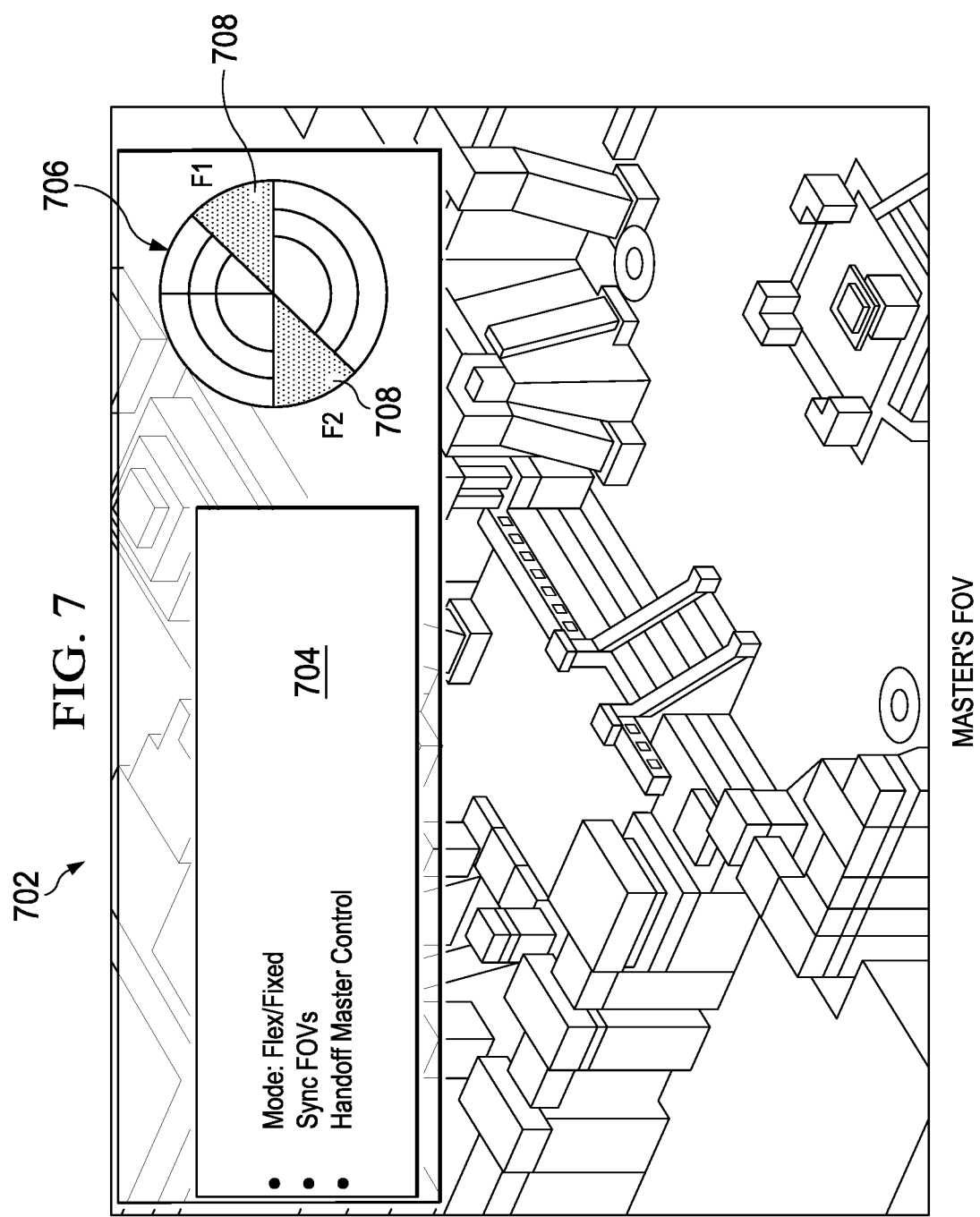
FIG. 7 illustrates an example master FOV of a master device containing a UI overlay according to embodiments of the present disclosure.

FIG. 7 illustrates an example master FOV of a master device containing a UI overlay according to various embodiments of this disclosure. The master FOV 702 can be generated on a display of a master HMD 106.

In some embodiments, the master HMD 106 can display UI elements 704 within the master FOV 702. The UI elements 704 can be related to the functions described in this disclosure. For example, the UI elements 704 can include an indicator of whether the follower HMDs 106 are set to the fixed guided mode or the flexible guided mode. This indicator could double as an actuatable button for instructing the follower HMDs 106 to switch between those modes. This indicator can apply to all follower HMDs 106, or could list the state of each follower HMD 106 separately. The UI element 704 can further include an actuatable button to cause the follower HMDs 106 to synchronize (or match) their FOVs to the master FOV 702, an actuatable button to initiate the process of transferring the "master" role to one of the follower HMDs 106, or any other useful UI element. For example, additional UI elements also can include indicators of whether one or more follower HMDs have viewed a highlighted object in the VR environment for a designated amount of time, which may correlate with completion of a task in an instructional session.

In some embodiments, one or more follower HMDs 106 send information related to their follower FOVs to the master HMD 106. The master HMD 106 can generate a map 706 of the virtual environment that contains indicators 708 showing the orientation of follower FOVs relative to the location and orientation of the master FOV 702. In the example of FIG. 7, the orientations of the FOVs of two follower HMDs are shown on the map 706 labeled as F1 and F2. The map 706 can be three dimensional (e.g., in the form of a sphere), allowing the indicators 708 to represent the three dimensional orientation of the respective follower FOV. The master HMD 106 also can be able to use this information to replicate a follower HMD's FOV in a similar manner to that described above for replicating the master FOV at a follower HMD.

In some embodiments, follower HMDs 106 displays a UI overlay similar to that of FIG. 7. For example, UI elements 704 can appear in the follower FOV of a follower HMD to indicate the mode (fixed or flexible), which can double as an actuatable button in the embodiments that allow the follower HMDs 106 to choose whether the follower HMDs 106 are in the flexible guided mode or the fixed guided mode. The UI elements 704 also can contain an actuatable button that allows the follower HMD to initiate synchronization of its FOV with the master FOV. The map 706 can have an indicator 708 to show the location of the master FOV and the orientation of the master HMD 106's FOV relative to the follower HMD 106. In some embodiments, the map 706 also displays this information for other follower HMDs 106. The UI elements 704 or the map 706 can additionally indicate whether the master HMD is currently interacting with the VR environment. This may allow the operator of the follower HMD 106 to determine whether to focus attention on the master HMD 106, for example by activating the function to synchronize the follower FOV with the master FOV.

Figure 8:
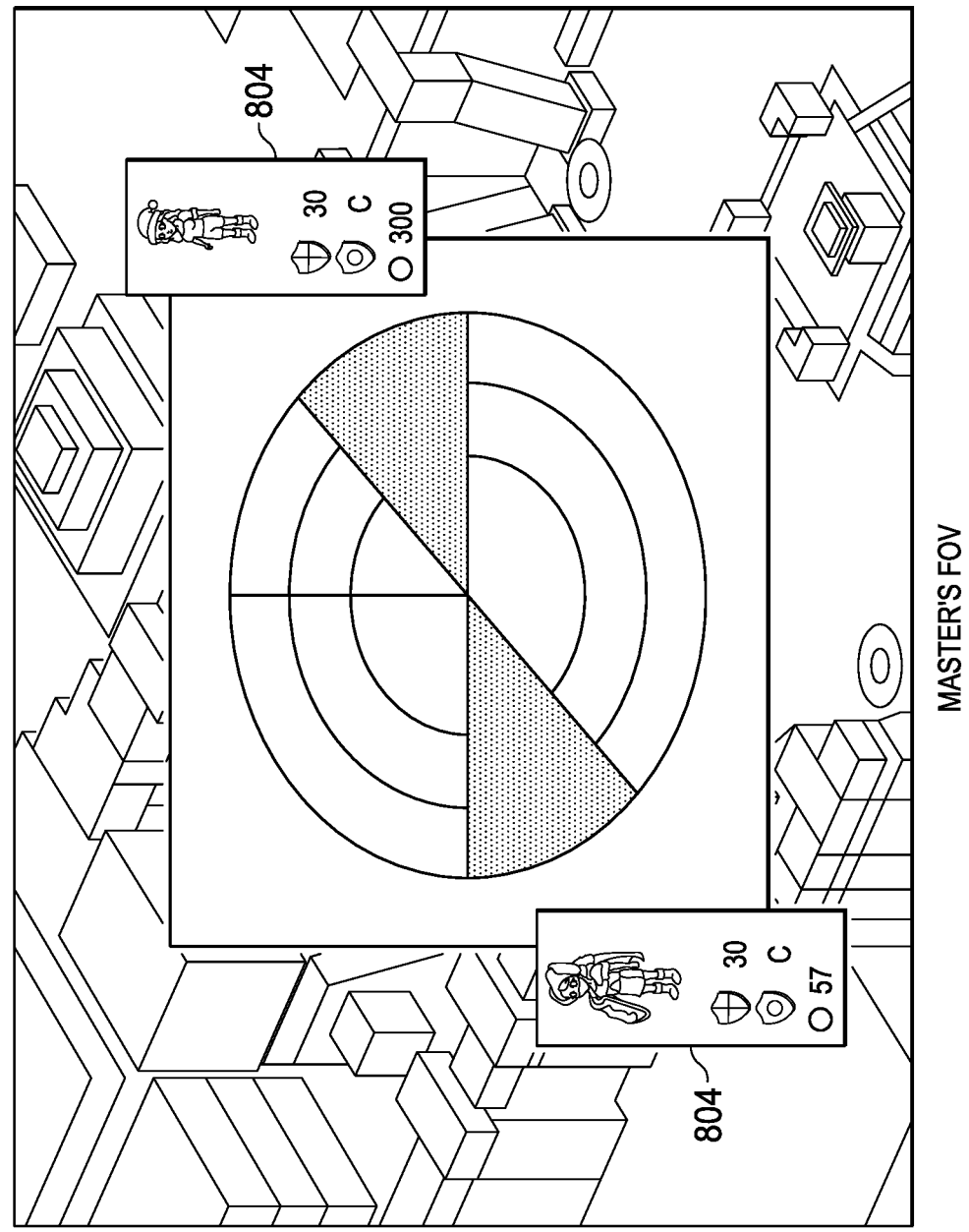
FIG. 8 illustrates an example master FOV of a master device containing a game UI overlay according to embodiments of the present disclosure.

Additional UI elements can also include various video game related features, as illustrated in FIG. 8, such as usernames and statuses 804 of players in a "follower" role in a VR video game. In some embodiments, the master HMD 106 functions as a "commander" or a "game master" in a VR video game, and may have access to additional functions within the VR environment that follower HMDs 106 do not have access to. The master HMD 106 can issue orders to the follower HMDs 106, which can include information that is rendered in the follower FOVs of the follower HMDs 106 as highlighted objectives within the game environment or as text in a UI element similar to UI element 704. The master HMD 106 also is able to navigate the VR environment in a less restricted manner than the follower HMDs 106. For example, the follower HMDs 106 can be restricted to an approximated walking speed of movement at ground level, while the master HMD 106 are able to move at a faster speed, may not be restricted to the ground level, and may have a larger portion of the VR environment displayed in its FOV than the follower HMDs 106. The master HMD 106 also is able to see through walls that follower HMDs 106 cannot see through, see information that follower HMDs 106 cannot see, have access to items that the follower HMDs 106 do not have access to, or have access to abilities (such as abilities to affect the environment) that follower HMDs 106 do not have access to. The master HMD 106 also can have the ability to give in-game items and abilities to the follower HMDs 106 or to take away in-game items or abilities from the follower HMDs 106.

In a game environment, transfer of the master role between HMDs 106 can be driven by the game itself rather than by operator choice. For example, upon achieving an in-game objective one or more of the follower HMDs 106 could be given the master role. In some embodiments, the transfer of roles can result in the master HMD 106 being moved to the follower role. Alternatively, a follower HMD 106 could spend in-game currency to obtain the master role.

In any of the embodiments described in this disclosure, the FOV information of HMDs 106 can be recorded and provided to a server, such as server 104, or to the master HMD 106. The recorded information can be used, for example, to determine whether follower HMDs 106 completed tasks such as viewing highlighted objects for a predetermined amount of time during an instructional session. Reviewing the recorded information may allow an instructor or an administrator in an educational program to review the activities of the operators of the follower HMDs 106 after an instructional session has ended in order to provide a critique, a grade, or the like. Similarly, information related to the FOV of the master HMD 106 can be recorded for review by an administrator to critique the behavior of the instructor in an instruction session. In a gaming context, recorded FOVs can be used to review performance in a gaming session.

Figure 9:
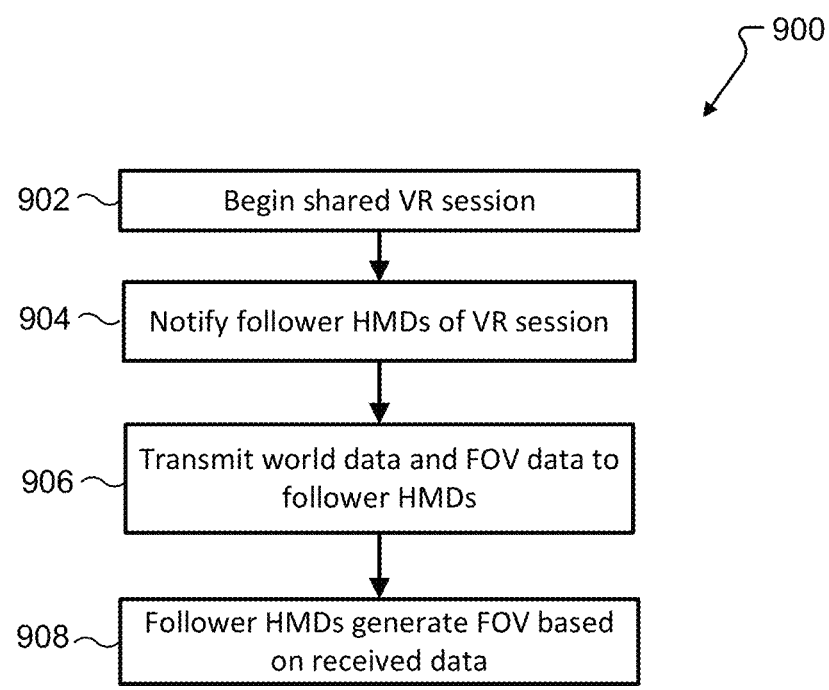
FIGS. 9, 10 and 11 illustrate flow diagrams of example methods for implementing a shared VR experience according to embodiments of the present disclosure.

FIG. 9 illustrates a flow diagram of an example method 900 for implementing a shared VR experience according to embodiments of the present disclosure. The method 900 can, for example, be performed by an HMD 106, such as an HMD 106 of FIG. 1. In this example, the method 600 is performed by a master HMD 106.

Beginning at block 902, the master HMD 106 begins a shared VR session. This can include, for example, launching a VR guide application. The VR guide application facilitates communication with, for example, other HMDs 106 (such as follower HMDs 106 or other master HMDs 106) or a server 104 to coordinate sharing of information for the shared VR session. Block 902 also can include a registration or setup process for the shared VR session in order to register other HMDs 106 that will be participating in the session.

At block 904, the HMD 106 notifies registered follower HMDs 106 that the VR session is starting. This may be facilitated by the VR guide app, which may also be installed on the follower HMDs 106. Alternatively, the follower HMDs 106 may not run the VR guide app, but may run another application for rendering a VR environment which the VR guide app is able to communicate with to facilitate the shared VR session. In some embodiments, the master HMD 106 communicates with a server 104, which facilitates the notification to the follower HMDs 106.

At block 906, the master HMD transmits world data and master FOV data to follower HMDs 106 in the shared VR session. World data could include data used to render the VR environment itself. In some embodiments, this data is provided in one transmission at the beginning of the VR session. In other embodiments, this data is continuously streamed to the follower HMDs 106. A server 104 can provide this data to the follower HMDs 106 in coordination with the master HMD 106. Master FOV data can include data related to the VR environment location of the master HMD 106, status information of the master HMD 106, and information indicating what is within the FOV of the master HMD 106. The master FOV data also can include event data that is related to actions taken by the operator of the master HMD 106 within the VR environment.

At block 908, the follower HMDs 106 use the world data and the master FOV data to generate their own FOVs. The world data can be used to render the VR environment for display within the FOV of the follower HMD 106. In some embodiments, the follower HMD 106 transmits, to the master HMD 106 or the server 104, information related to its FOV, and only receives world data as necessary to render the VR environment that is visible within the follower FOV. The event data can be used to replicate the actions performed by the operator of the master HMD 106 in the VR environment. For example, if the operator highlights an object in the VR environment, the follower HMD 106 can use the information to highlight that object in its own FOV, as described above. In some embodiments, the follower HMD 106 uses the data to render a copy of the master FOV as the follower FOV along with a rendering of actions taken by the operator of the master HMD 106.

Although FIG. 9 is described in the context of a master HMD 106, it is understood that various modifications may be made to FIG. 9. For example, the method 900 could be performed by a server 104. This may be useful, for example, to offload computational burdens from the master HMD 106.

Figure 10:
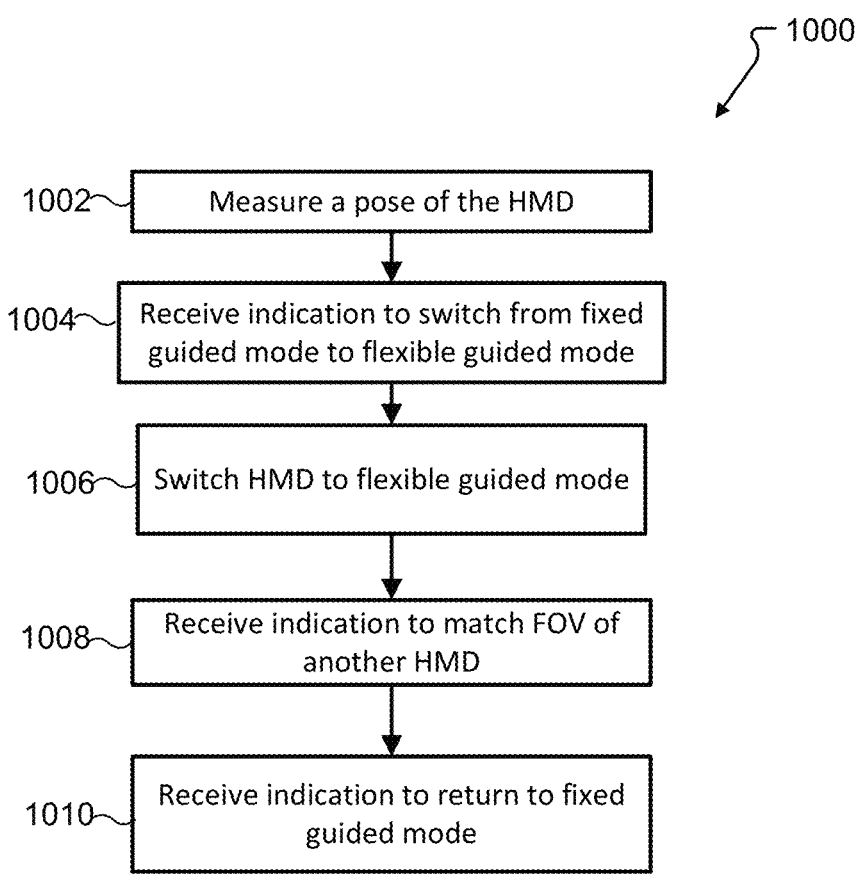

FIG. 10 illustrates a flow diagram of an example method 1000 for implementing a shared VR experience according to embodiments of the present disclosure. The method 1000 may, for example, be performed by an HMD 106, such as an HMD 106 of FIG. 1. In this example, the method 1000 is performed by a follower HMD 106.

Beginning at block 1002, the follower HMD 106 measures its pose. Pose measurement can be performed via an IMU, as described above. The pose can be used to determine what to render in the FOV of the follower HMD 106.

At block 1004, the follower HMD 106 in a shared VR session receives an indication to switch from a fixed guided mode to a flexible guided mode. This indication may be determined from data received from the IMU that indicates that the pose of the follower HMD 106 has diverged a predetermined amount (e.g., 20 degrees) from the initial pose of the follower HMD 106. This indication can, alternatively, be received by the follower HMD 106 from a master HMD 106 in the same VR session. After the follower HMD 106 has switched modes, the follower HMD 106 can transmit to the master HMD 106 an indication that it has switched modes.

At block 1006, the follower HMD 106 switches from a fixed guided mode to a flexible guided mode. In the flexible guided mode, as described above, the HMD 106 can change its FOV as desired, and is not restricted to matching the master FOV.

At block 1008, the follower HMD 106 receives an indication to match its FOV to the FOV of another HMD 106, such as the master HMD 106. As described above, an animation (for example, fading out and fading back in, or zooming out and zooming back in) can be used to reduce the shock of this transition on the operator of the follower HMD 106.

At block 1010, the follower HMD 106 receives an indication to return to the fixed guided mode. This indication can be determined from data received from the IMU that indicates that the pose of the follower HMD 106 has returned to within a predetermined threshold of the initial pose of the follower HMD 106. In other embodiments, the follower HMD 106 receives information from the master HMD 106 that includes the orientation and location of the FOV of the master HMD 106. In this case, the indication to return to the fixed guided mode can be determined from data received from the IMU that indicates that the pose of the follower HMD 106 has caused the FOV of the follower HMD 106 to be within a predetermined threshold of matching the FOV of the master HMD 106. In other embodiments, the indication to return to the fixed guided mode is received from the master HMD 106, as described above.

Figure 11:
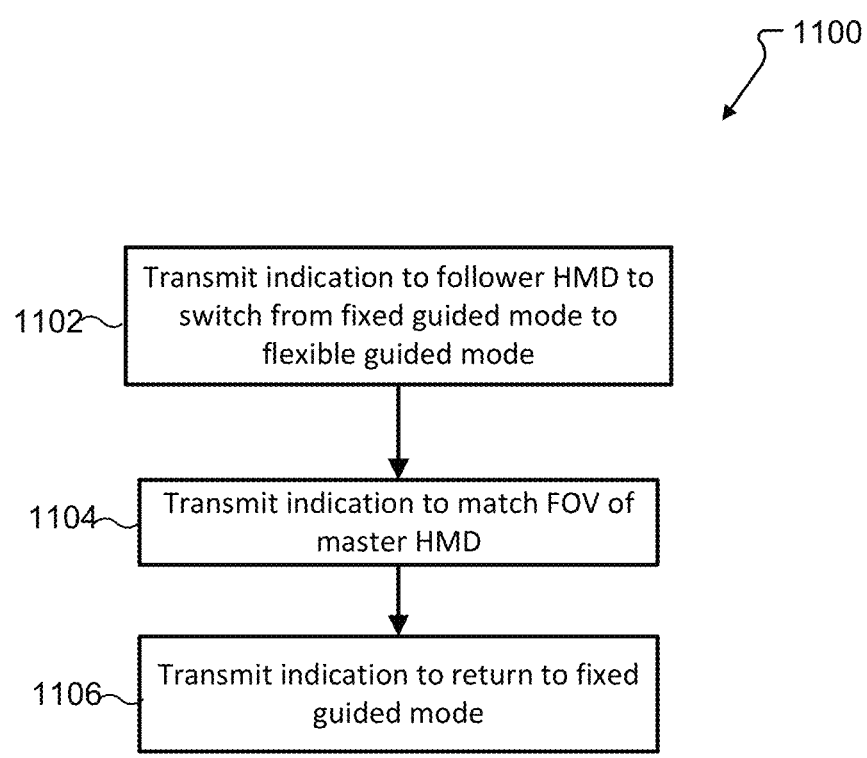

FIG. 11 illustrates a flow diagram of an example method 1100 for implementing a shared VR experience according to embodiments of the present disclosure. The method 1100 can, for example, be performed by an HMD 106, such as an HMD 106 of FIG. 1. In this example, the method 600 is performed by a master HMD 106.

Beginning at block 1102, the master HMD 106 in a VR session transmits to one or more follower HMDs 106 in the same VR session an indication to switch from a fixed guided mode to a flexible guided mode. The master HMD 106 can receive from the follower HMD 106 an indication that it has switched modes.

At block 1104, the master HMD 106 transmits to the one or more follower HMDs 106 an indication to match their FOVs to the FOV of the master HMD 106. As described above, an animation (for example, fading out and fading back in, or zooming out and zooming back in) can be used to reduce the shock of this transition on the operator of the follower HMD 106.

At block 1106, the master HMD 106 transmits to one or more of the follower HMDs 106 an indication to return to the fixed guided mode. The mater HMD 106 can transmit this indication to any desired subset of the follower HMDs 106 or to the whole set of follower HMDs 106.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A head mounted display (HMD), comprising:
a transceiver;
a display; and
a processor coupled to the transceiver and the display, the processor configured to:
control the transceiver to receive, from at least one other HMD, data related to a field of view (FOV) of the at least one other HMD in a virtual reality (VR) environment, the data including at least one of orientation information or status information of the at least one other HMD;
generate, using the data related to the FOV of the at least one other HMD, an FOV of the HMD in the VR environment for display on the display; and
cause the display to display a user interface (UI) element comprising a map overlaid on the FOV of the HMD that includes an indication of the data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

2. The HMD of claim 1, wherein the processor is further configured to allow the FOV of the HMD to be controlled by at least one other HMD.

3. The HMD of claim 1, further comprising:
an inertial measurement unit (IMU) coupled to the processor,
wherein the processor is further configured to determine, based on data from the IMU, an indication to switch the HMD from a fixed guided mode to a different mode from the fixed guided mode.

4. The HMD of claim 3, wherein:
the different mode is a flexible guided mode; and
the processor is further configured to receive an indication from the at least one other HMD to match the FOV of the HMD to the FOV of the at least one other HMD while remaining in the flexible guided mode.

5. The HMD of claim 3, wherein:
the processor is configured to determine the indication to switch the HMD from the fixed guided mode to the different mode by detecting, based on the data from the IMU, a movement of the HMD that is greater than a predetermined threshold; and the processor is further configured to, when the movement of the HMD that is greater than the predetermined threshold is detected, receive the indication to switch the HMD from the fixed guided mode to the different mode from the fixed guided mode.

6. The HMD of claim 3, wherein the processor is further configured to:
receive an indication to return to the fixed guided mode;
detect, based on data from the IMU, a return of the HMD to an initial pose; and
when the return of the HMD to the initial pose is detected, interpret the detection as receiving the indication to return to the fixed guided mode.

7. The HMD of claim 1, wherein the processor is further configured to receive an indication for the HMD to enter a master role, wherein the master role allows the HMD to control a fixed guided mode or a flexible guided mode of one or more HMDs in a follower role.

8. The HMD of claim 1, wherein the data related to the FOV of the at least one other HMD comprises at least one of orientation information, VR environment location information, or status information.

9. The HMD of claim 1, wherein the processor is further configured to:
control the transceiver to receive, from the at least one other HMD, data related to actions of the at least one other HMD; and
replicate, using the data related to the actions of the at least one other HMD, the actions within the FOV of the HMD in the VR environment.

10. The HMD of claim 1, further comprising:
a memory coupled to the processor and configured to record actions of the HMD and the FOV of the HMD,
wherein the processor is further configured to control the transceiver to transmit the recorded actions and the recorded FOV to at least one of a server or the at least one other HMD.

11. A head mounted display (HMD), comprising:
a transceiver;
a display; and
a processor coupled to the transceiver and the display, the processor configured to:
control the transceiver to transmit, to at least one other HMD, data related to a field of view (FOV) of the HMD in a virtual reality (VR) environment, the FOV of the HMD displayed on the display, wherein the data related to the FOV of the HMD is used to generate an FOV of the at least one other HMD in the VR environment for display on a display of the at least one other HMD;
receive, from the at least one other HMD, data related to the FOV of the at least one other HMD, the data including at least one of orientation information or status information of the at least one other HMD; and
cause the display to display a user interface (UI) element comprising a map overlaid on the FOV of the HMD that includes an indication of the received data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

12. The HMD of claim 11, wherein the processor is further configured to control the FOV of the at least one other HMD.

13. The HMD of claim 11, wherein the processor is further configured to control the transceiver to receive, from the at least one other HMD, an indication that the at least one other HMD has switched from a fixed guided mode to a different mode from the fixed guided mode.

14. The HMD of claim 13, wherein:
the different mode is a flexible guided mode; and
the processor is further configured to control the transceiver to transmit, to the at least one other HMD, an indication to match the FOV of the at least one other HMD to the FOV of the HMD while remaining in the flexible guided mode.

15. The HMD of claim 13, wherein the processor is further configured to control the transceiver to receive, from the at least one other HMD, an indication that the at least one other HMD has returned to the fixed guided mode.

16. The HMD of claim 11, wherein the processor is further configured to control the transceiver to transmit, to the at least one other HMD, an indication for the at least one other HMD to enter a master role, wherein the master role allows the at least one other HMD to control a fixed guided mode or a flexible guided mode of one or more HMDs in a follower role.

17. The HMD of claim 11, wherein the data related to the FOV of the HMD comprises at least one of orientation information, VR environment location information, or status information.

18. The HMD of claim 11, wherein the processor is further configured to:
control the transceiver to transmit, to the at least one other HMD, data related to actions of the HMD and an indication to replicate, using the data related to the actions of the HMD, the actions within the FOV of the at least one other HMD in the VR environment.

19. The HMD of claim 11, further comprising:
a memory coupled to the processor,
wherein the processor is further configured to:
control the transceiver to receive, from the at least one other HMD, recorded actions and a recorded FOV of the at least one other HMD, and
store, in the memory, the recorded actions and the recorded FOV of the at least one other HMD.

20. A method, comprising:
receiving, by an HMD from at least one other HMD, data related to a field of view (FOV) of the at least one other HMD in a virtual reality (VR) environment, the data including at least one of orientation information or status information of the at least one other HMD;
generating, using the data related to the FOV of the at least one other HMD, an FOV of the HMD in the VR environment for display on a display; and
displaying on the display a user interface (UI) element comprising a map overlaid on the FOV of the HMD that includes an indication of the data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

21. The method of claim 20, further comprising allowing the FOV of the HMD to be controlled by at least one other HMD.

22. The method of claim 20, further comprising determining, based on data from an inertial measurement unit (IMU), an indication to switch the HMD from a fixed guided mode to a different mode from the fixed guided mode.

23. The method of claim 22, wherein:
the different mode is a flexible guided mode; and
the method further comprises receiving an indication to match the FOV of the HMD to the FOV of the at least one other HMD while remaining in the flexible guided mode.

24. The method of claim 22, further comprising:
determining the indication to switch the HMD from the fixed guided mode to the different mode by detecting, based on the data from the IMU, a movement of the HMD that is greater than a predetermined threshold; and
when the movement of the HMD that is greater than the predetermined threshold is detected, receiving the indication to switch the HMD from the fixed guided mode to the different mode from the fixed guided mode.

25. The method of claim 22, further comprising:
receiving an indication to return to the fixed guided mode;
detecting, based on data from the IMU, a return of the HMD to an initial pose; and
when the return of the HMD to the initial pose is detected, interpreting the detection as receiving the indication to return to the fixed guided mode.

26. A method, comprising:
transmitting, from an HMD to at least one other HMD, data related to a field of view (FOV) of the HMD in a virtual reality (VR) environment, wherein the data related to the FOV of the HMD is used to generate an FOV of the at least one other HMD in the VR environment;
receiving, from the at least one other HMD, data related to the FOV of the at least one other HMD, the data including at least one of orientation information or status information of the at least one other HMD; and
displaying on a display a user interface (UI) element comprising a map overlaid on the FOV of the HMD that includes an indication of the received data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

27. The method of claim 26, further comprising controlling the FOV of the at least one other HMD.

28. The method of claim 26, further comprising receiving, from the at least one other HMD, an indication that the at least one other HMD has switched from a fixed guided mode to a different mode from the fixed guided mode.

29. The method of claim 28, wherein:
the different mode is a flexible guided mode; and
the method further comprises transmitting, to the at least one other HMD, an indication to match the FOV of the at least one other HMD to the FOV of the HMD while remaining in the flexible guided mode.

30. The method of claim 28, further comprising receiving, from the at least one other HMD, an indication that the at least one other HMD has returned to the fixed guided mode.

31. A non-transitory computer readable medium embodying a computer program, the computer program comprising computer readable program code that when executed causes at least one processing device to:

control a transceiver to receive, at an HMD from at least one other HMD, data related to a field of view (FOV) of the at least one other HMD in a virtual reality (VR) environment, the data including at least one of orientation information or status information of the at least one other HMD;
generate, using the data related to the FOV of the at least one other HMD, an FOV of the HMD in the VR environment; and
cause a display to display a user interface (UI) element comprising a map overlaid on the FOV of the HMD that includes an indication of the data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

32. The non-transitory computer readable medium of claim 31, wherein the computer readable program code further causes the at least one processing device to:
allow the FOV of the HMD to be controlled by at least one other HMD.

33. The non-transitory computer readable medium of claim 31, wherein the computer readable program code further causes the at least one processing device to:
determine, based on data from an inertial measurement unit (IMU), an indication to switch the HMD from a fixed guided mode to a different mode from the fixed guided mode.

34. The non-transitory computer readable medium of claim 33, wherein:
the different mode is a flexible guided mode; and
the computer readable program code further causes the at least one processing device to receive an indication to match the FOV of the HMD to the FOV of the at least one other HMD while remaining in the flexible guided mode.

35. The non-transitory computer readable medium of claim 33, wherein the computer readable program code further causes the at least one processing device to:
determine the indication to switch the HMD from the fixed guided mode to the different mode by detecting, based on the data from the IMU, a movement of the HMD that is greater than a predetermined threshold; and
when the movement of the HMD that is greater than the predetermined threshold is detected, receive the indication to switch the HMD from the fixed guided mode to the different mode from the fixed guided mode.

36. The non-transitory computer readable medium of claim 33, wherein the computer readable program code further causes the at least one processing device to:
receive an indication to return to the fixed guided mode;
detect, based on data from the IMU, a return of the HMD to an initial pose; and
when the return of the HMD to the initial pose is detected, interpret the detection as receiving the indication to return to the fixed guided mode.

37. A non-transitory computer readable medium embodying a computer program, the computer program comprising computer readable program code that when executed causes at least one processing device to:
control a transceiver to transmit, from an HMD to at least one other HMD, data related to a field of view (FOV) of the HMD in a virtual reality (VR) environment, wherein the data related to the FOV of the HMD is used to generate an FOV of the at least one other HMD in the VR environment;

receive, from the at least one other HMD, data related to the FOV of the at least one other HMD, the data including at least one of orientation information or status information of the at least one other HMD; and cause a display to display a user interface (UI) element comprising a map overlaid on the FOV of the HMD that includes an indication of the received data related to the FOV of the at least one other HMD, the indication of the data related to the FOV including an indication on the map of an orientation of the FOV of the at least one other HMD relative to an orientation of the FOV of the HMD, regardless of whether the orientation of the FOV of the at least one other HMD overlaps with the orientation of the FOV of the HMD.

38. The non-transitory computer readable medium of claim 37, wherein the computer readable program code further causes the at least one processing device to:
control the FOV of the at least one other HMD.

39. The non-transitory computer readable medium of claim 37, wherein the computer readable program code further causes the at least one processing device to:
control the transceiver to receive, from the at least one other HMD, an indication that the at least one other HMD has switched from a fixed guided mode to a different mode from the fixed guided mode.

40. The non-transitory computer readable medium of claim 39, wherein:
the different mode is a flexible guided mode; and
the computer readable program code further causes the at least one processing device to control the transceiver to transmit, to the at least one other HMD, an indication to match the FOV of the at least one other HMD to the FOV of the HMD while remaining in the flexible guided mode.

41. The non-transitory computer readable medium of claim 39, wherein the computer readable program code further causes the at least one processing device to:
control the transceiver to receive, from the at least one other HMD, an indication that the at least one other HMD has returned to the fixed guided mode.

* * * * *